United States Patent [19]

Wakamatsu et al.

[11] 4,383,795

[45] May 17, 1983

[54] BAG TRANSFER APPARATUS

[75] Inventors: Atsuyuki Wakamatsu, Shimizu; Keisuke Tonooka, Shizuoka, both of Japan

[73] Assignee: Daiwa Can Company, Limited, Tokyo, Japan

[21] Appl. No.: 217,258

[22] Filed: Dec. 17, 1980

[30] Foreign Application Priority Data

Apr. 7, 1980 [JP] Japan .................. 55/46679[U]

[51] Int. Cl.³ .......................................... B65G 61/00
[52] U.S. Cl. ..................................... 414/753; 53/494;
271/268; 294/87 R; 414/120; 414/416
[58] Field of Search ............... 414/416, 120, 121, 730,
414/744 B, 751, 752, 753; 294/64, 87 R, 88,
115; 271/268, 261, 18; 53/494, 539, 247

[56] References Cited

U.S. PATENT DOCUMENTS

| | | | |
|---|---|---|---|
| 3,081,124 | 3/1963 | Kaplan | 294/87 R |
| 3,776,398 | 12/1973 | Stuart et al. | 414/120 X |
| 4,302,142 | 11/1981 | Kuhl et al. | 414/120 |

FOREIGN PATENT DOCUMENTS

| | | | |
|---|---|---|---|
| 641659 | 5/1962 | Canada | 53/539 |
| 1959583 | 4/1971 | Fed. Rep. of Germany | 414/121 |
| 2313598 | 9/1974 | Fed. Rep. of Germany | 414/120 |

*Primary Examiner*—Douglas C. Butler
*Assistant Examiner*—Donald W. Underwood
*Attorney, Agent, or Firm*—Daley, Boettcher & Brandt

[57] ABSTRACT

Apparatus for simultaneously pinching a plurality of elongated bags disposed in parallel, side by side relation with one another and transferring the bags. The apparatus includes a gripper mechanism arranged to pinch each bag at two longitudinally spaced locations thereon and devices for moving the gripper mechanism while the bags are pinchingly thereby. Sensing devices are provided to detect the state of pinched engagement of the bags with the gripper mechanism. If one or more of the bags is not pinched or is improperly pinched by the gripper mechanism, the transfer motion is arrested to prevent damage to the bag or the apparatus. The apparatus can be utilized to remove paper bags containing stacks of metal can lids from boxes.

3 Claims, 4 Drawing Figures

BAG TRANSFER APPARATUS

BACKGROUND OF THE INVENTION

The present invention relates to apparatus for simultaneously transferring a plurality of elongated, article containing bags from one location to another.

Apparatus according to the present invention can be utilized, for example, in the canning industry. Generally, cylindrical stacks of disk-like can lids are enclosed in elongated paper bags when the lids are shipped from the can manufacturer to the canning plant. A plurality of such bags, each containing one stack of can lids, may be shipped in a single box. The bags within each box may be arranged in superposed layers, with the bags of each layer being disposed parallel to one another and in contact with one another. For example, each box may contain ten bags disposed in two layers of five bags each. Before the lids can be utilized in the canning plant, the bags must be removed from the boxes and transported to a processing station where the can lids are removed from the bags.

Prior to the present invention, removal of such bags from the boxes has generally been performed manually and has required an inordinate amount of labor. Although various mechanical article transporting devices have been developed prior to the present invention for removing pluralities of cans, bottles or similar rigid, regular articles from boxes, such devices have generally not been suitable for removing bags of can lids from boxes. The bags are not rigid and consequently may assume somewhat irregular shapes. Because the bags are arranged side-by-side, parallel to one another and in contact with one another, it is quite difficult to place any hook or other article engaging member between adjacent bags. As the bags are ordinarily made of paper, there is a risk of rupturing the bags or of damaging the can lids during transfer of the bags. Accordingly, construction of a satisfactory bag transfer apparatus has presented a formidable problem heretofore.

SUMMARY OF THE INVENTION

The present invention provides apparatus which can simultaneously pinch a plurality of elongated bags disposed side-by-side, parallel to one another and in close proximity to one another at a pickup location and transfer these bags to a discharge location. Apparatus according to the present invention may be used, for example, to mechanically remove bags encasing can lids from boxes or from pallets.

The present invention also provides a bag transfer apparatus which can sense imperfect pinched engagement of the bags. Such apparatus can stop automatically to protect the bags and the apparatus from accidental damage which might otherwise be caused by an imperfectly pinched bag.

Moreover, the present invention provides a bag pinching mechanism or gripper means suitable for use in the aforementioned bag transfer apparatus.

The bag transfer apparatus of the present invention may include gripper means for pinching each elongated bag to be transferred at two longitudinally spaced locations thereon and means for moving the gripper means from a pickup location to a discharge location while the bags are pinched therewith. Sensing means may be provided for detecting the state of pinched engagement of the bags with the gripper means and producing a positive signal only if every one of the bags to be transferred is pinched by the gripper means at both of the aforesaid two locations thereon. The sensing means may be arranged to stop operation of the moving means if the aforesaid positive signal is absent during movement of the gripper means towards the discharge location.

The gripper means may include a gripper frame and a plurality of pairs of pincer assemblies mounted to the gripper frame. The pincer assemblies may be disposed substantially in a common horizontal plane beneath the gripper frame and the pincer assemblies of each pair may be disposed in a single row. Such rows may be side-by-side and parallel to one another. If the distances between such rows are substantially equal to the distances between the center lines of adjacent bags, the two pincer assemblies of each row may be pinched with one bag. The pincer assemblies may be configured so that they will pinch portions of each bag adjacent the top of the bag. If such configuration is adopted, there will be no need to force elements of the gripper means between adjacent bags during pinched engagement of the gripper means with the bags.

The sensing means may include a plurality of feelers, each such feeler being mounted to the gripper frame for movement relative thereto between an upper position and a lower position. One such feeler may be mounted between the pincer assemblies of each pair of pincer assemblies. When a bag is properly pinched by both pincer assemblies of a pair, the associated feeler will rest on the bag and will be retained in its upper position. However, if the pincer assemblies of the pair completely fail to pinch a bag, the associated feeler will drop to its lower position. Moreover, if only one of the two pincher assemblies of the pair pinches a bag so that the pinched end of the bag is supported but the non-pinched end hangs downwardly, the associated feeler will drop to its lower position. The sensing means may detect the positions of the feelers and produce the aforementioned positive signal only when all of the feelers are in their respective upper positions so that the positive signal will only be produced if all of the pairs of pincer assemblies properly pinch the respective bags of two locations.

DETAILED DESCRIPTION OF THE PREFERRED EMBODIMENTS

The apparatus depicted in FIGS. 1 through 4 is arranged to transfer paper bags containing can lids from boxes, each bag being about 80 cm. long, two layers of five bags each being disposed within each box, a flat, plate-like cardboard partition being disposed between the layers.

Figure 1:
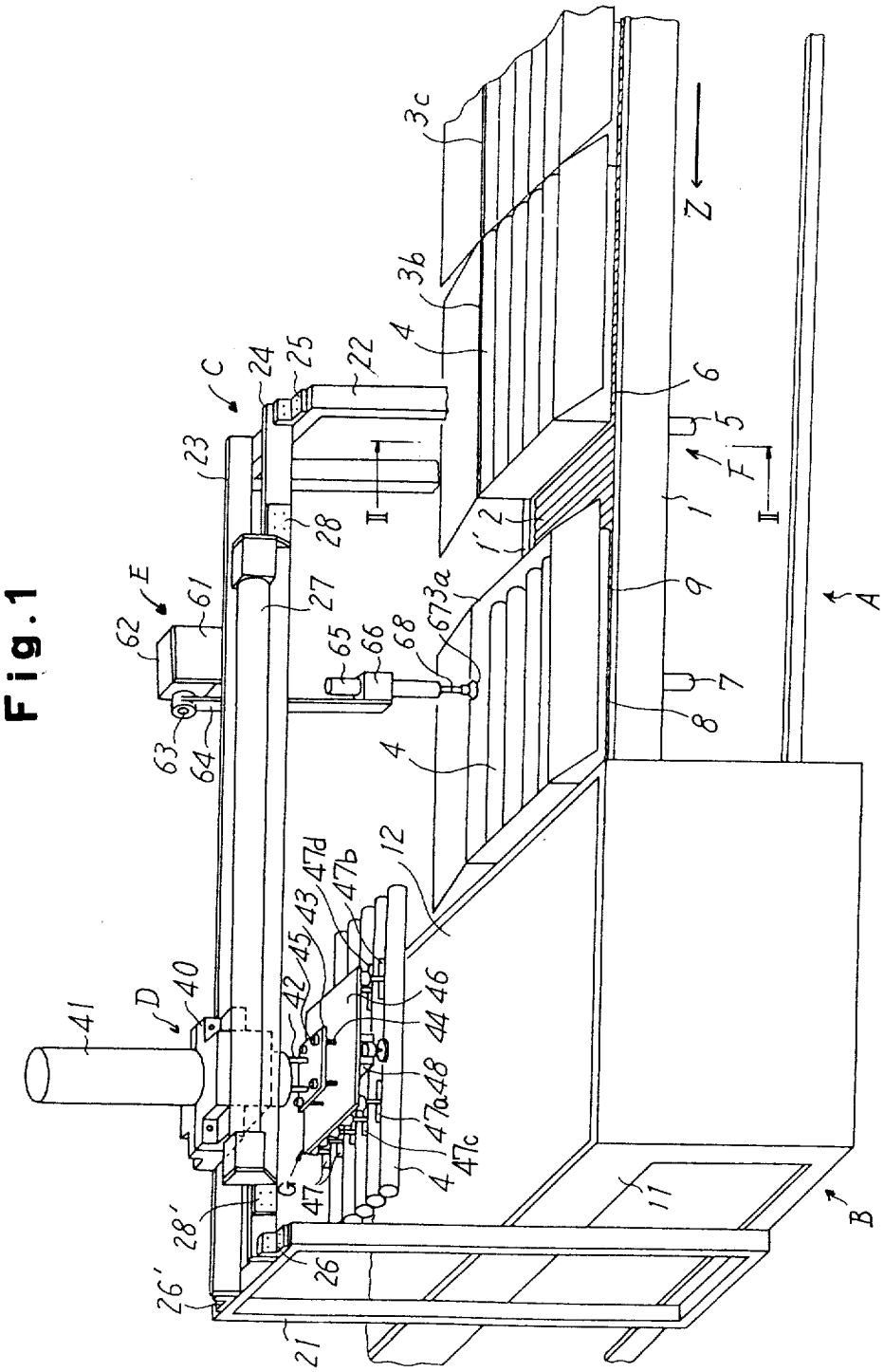
FIG. 1 is a schematic perspective view of a bag transfer apparatus according to an embodiment of the present invention.

As illustrated in FIG. 1, the apparatus includes a conveyor A and an envelope supporting base B. Conveyor A advances a series of boxes 3a, 3b, 3c, etc. in sequence to present each box in the series at a pickup location adjacent base B. Gripper support and moving mechanisms C and D move the gripper mechanism G between the pickup location and a discharge location atop base B. When the gripper mechanism is at the pickup location, it pinches bags 4 disposed in the box which is at such location so that upon movement of the gripper assembly to the discharge location, the pinched bags will move with the gripper assembly. When the gripper mechanism reaches the discharge location, it releases the bags and deposits them atop base B.

Figure 2:
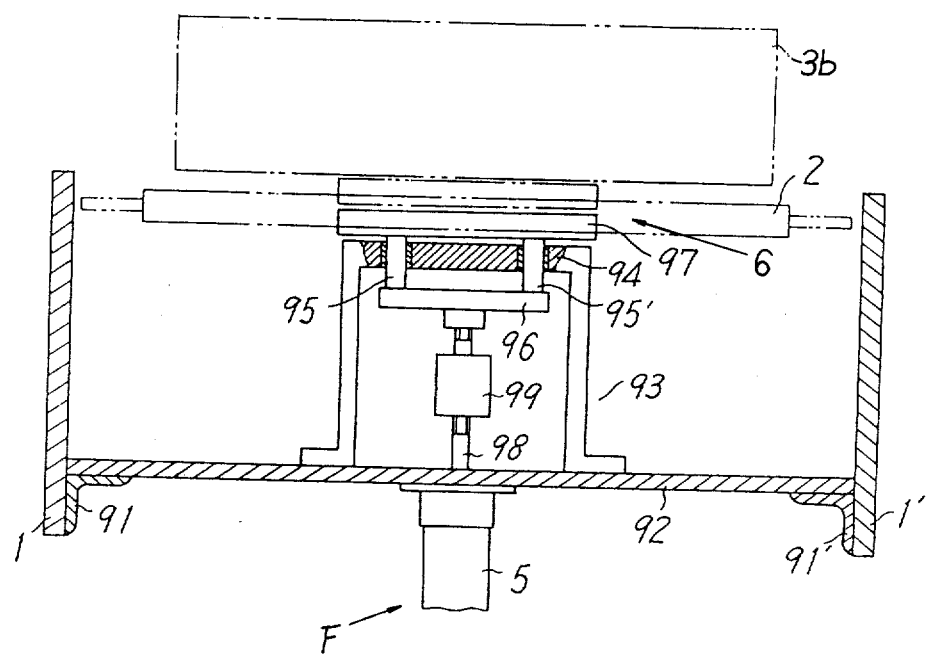
FIG. 2 is a fragmentary sectional view taken along line II—II in FIG. 1.

Conveyor A includes a plurality of elongated, cylindrical rollers 2 rotatably supported on a pair of side plates 1 and 1', the rollers being coplanar and parallel to one another. Appropriate means (not shown) are provided for rotating the rollers 2 to advance boxes placed atop the rollers in the direction indicated by the arrow Z in FIG. 1. A stopping device F is provided to control the advance of the boxes on conveyor A. This device includes a fluid operable cylinder 5 mounted beneath siderails 1 and 1'. A gap 6 is provided between adjacent rollers above cylinder 5. As shown in FIG. 2, cylinder 5 is supported from side plates 1 and 1' by a plate 92 and a pair of brackets 91 and 91', cylinder 5 being mounted on the underside of plate 92 and disposed generally vertically. A channel member 93 is mounted atop plate 92 but beneath rollers 2. Two vertical rods 95 and 95' extend through holes in the horizontal top portion 94 of channel member 93, the lower ends of rods 95 and 95' being connected to one another by a connecting plate 96. A horizontally disposed stop rod 97 is attached to the upper ends of vertical rods 95 and 95'. Connecting plate 96 is attached to piston rod 98 of cylinder 5 through a coupling 99. When piston rod 98 of cylinder 5 is in its retracted position, as illustrated in FIG. 2, stop rod 97 is disposed in gap 6 between rollers 2 as illustrated in solid lines in FIG. 2. In this position, stop rod 97 does not project above rollers 2 and hence does not interfere with advancement of boxes along the conveyor. However, when piston rod 98 of cylinder 5 is extended, stop rod 97 moves upwardly to the elevated position illustrated in broken lines in FIG. 2. When stop rod 97 is in such elevated position, it projects above rollers 2 and engages the underside of a box, such as the box 3b shown in broken lines in FIG. 2, to arrest movement of such box along the conveyor.

As seen in FIG. 1, another fluid operable cylinder 7 is mounted beneath rollers 2 adjacent the downstream or left-hand end of the conveyor. Clearances 8 and 9 are provided between rollers 2 adjacent cylinder 7. Cylinder 7 can be actuated to swing ejector rails (not shown) upwardly through clearance 8 and 9 until such ejector rails extend above rollers 2. In their upwardly extended positions, the ejector rails slope downwardly towards side plate 1. An empty box can be ejected from the conveyor by elevating the rails until the box slides on the rails and falls off of the conveyor. Appropriate arresting devices (not shown) are provided to arrest movement of each box when it reaches the pickup location at the downstream end of conveyor A. Box 3a is at the pickup location.

Base B includes a frame 11 and a flat, horizontally disposed envelope supporting surface 12. Base B is disposed adjacent the downstream or left-hand end of conveyor A.

The gripper support and movement structure C and D includes a frame which has a vertically extensive fixed support 21 attached to base B on the side of the base remote from conveyor A and another vertically extensive support 22 disposed on the opposite side of base B from support 21. The legs of support 22, which are only partially shown in FIG. 1, extend on opposite sides of conveyor A, one such leg being adjacent support plate 1 and the other such leg being adjacent support plate 1'. A pair of guide rails 23 and 24 are mounted atop supports 21 and 22, the guide rails being fixed to the supports by brackets 25, 26 and 26'. Guide rails 23 and 24 extend parallel to one another across base B and over the downstream portion of conveyor A, the guide rails being generally horizontally disposed and extending parallel to conveyor A.

A horizontal fluid operable cylinder 27 is mounted to the side of guide rail 24 remote from guide rail 23 by brackets 28 and 28' so that the cylinder extends substantially parallel to guide rail 24. A carriage 40 is slideably mounted to guide rails 23 and 24 and connected to the movable member (not shown) of cylinder 27 so that cylinder 27 can reciprocate carriage 40 between the position illustrated in FIG. 1 and a position above the downstream or left-hand end of conveyor A. A vertical fluid operable cylinder 41 is mounted to carriage 40 and a pair of working rods 42 are connected to the movable element of cylinder 41. Cylinder 41 can be actuated to move rods 42 up and down relative to carriage 40. The gripper mechanism G is mounted to the lower ends of these rods. Thus, gripper mechanism G can be raised and lowered by actuating cylinder 41 and can be moved horizontally by actuating cylinder 27 to slide carriage 40 along guide rails 23 and 24.

Figure 3:
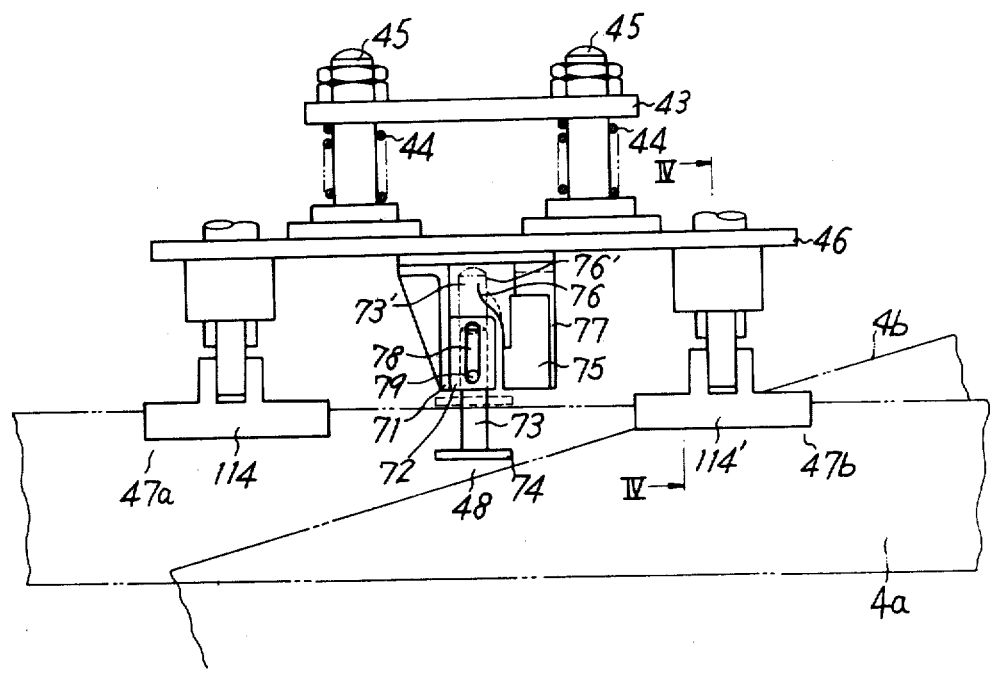
FIG. 3 is a fragmentary view depicting a portion of the apparatus shown in FIG. 1.

Gripper mechanism G includes a mounting plate 43 directly connected to the lower ends of rods 42. As best seen in FIG. 3, a gripper frame or plate 46 is suspended beneath plate 43 by bolts 45. Bolts 45 are vertically slideable with respect to plate 43 so that plate 46 can be moved towards or away from plate 43. Compression springs 44 which surround bolts 45 urge plate 46 downwardly away from plate 43, the downward travel of plate 46 relative to plate 43 being limited by nuts threadedly engaged with bolts 45.

Ten pincer assemblies 47 are mounted on the underside of plate 46, only two such pincer assemblies 47a and 47b being visible in FIG. 3. As best seen in FIG. 1, the pincer assemblies are arranged in five rows, two pincer assemblies constituting each row. For example, pincer assemblies 47a and 47b constitute one such row and pincer assemblies 47c and 47d constitute the next adjacent row. The rows are disposed side by side and extend parallel to one another. The lower or active portions of all of the pincer assemblies are disposed in a common horizontal plane.

Figure 4:
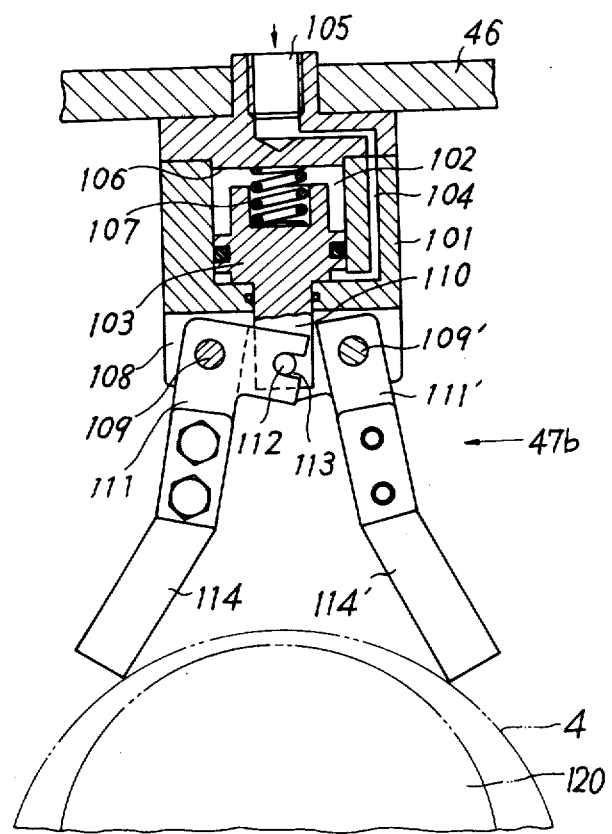
FIG. 4 is a fragmentary sectional view taken along line IV—IV in FIG. 1.

One of the pincer assemblies 47b is illustrated in FIG. 4. This assembly includes a fluid operable cylinder, the outer casing 101 of such cylinder being fixedly mounted to plate 46. A piston 103 is slideably disposed in the bore 102 of casing 101. Passageway 104 extends through the wall of casing 101, one end of such passageway being open to bore 102 at the lower end thereof, the other end of passageway 104 communicating with an inlet fitting 105. Thus, air can be admitted to bore 102 of the cylinder beneath piston 103 to force the piston upwardly. A compression spring 107 is disposed in bore 102 between piston 103 and the upper end wall 106 of the bore. A vertically extensive plate 108 is fixedly mounted to the lower end of cylinder casing 101. Another vertically extensive plate (not shown) is also fixedly mounted to the lower end of the cylinder casing so that the plates extend generally parallel to one another. Two L-shaped links 111 and 111' are mounted to plate 108 and to the opposing plate (not shown) by pins 109 and 109' respectively, so that links 111 and 111' can pivot relative to plate 108 about such pins. A piston rod 110 formed integrally with piston 103 extends downwardly between links 111 and 111'. Pin 112 extends through piston rod 110, pin 112 being received in a U-shaped recess 113 in bracket 111 and in a similar recess (not shown) in bracket 111'. Two opposed jaws 114 and 114' are provided. Jaw 114 is fixed to the lower end of link 111, and jaw 114' is fixed to the lower end of link 111'.

When compressed air is introduced into the lower portion of bore 102 (beneath piston 103), the piston moves upwardly within bore 102. Upward movement of piston 103 and piston rod 110 causes link 111 to pivot about pin 109 in the counterclockwise direction as seen in FIG. 4 and also causes link 111' to pivot in the clockwise direction about pin 109'. Such pivoting motion of the links swings jaws 114 and 114' towards one another. When the air pressure in bore 102 is released, spring 107 forces piston 103 downwardly, thus swinging jaws 114 and 114' away from one another and returning them to the open position illustrated in FIG. 4.

When the gripper mechanism is juxtaposed with the bags preparatory to pinched engagement of the bags, the jaws of each pincer assembly are juxtaposed with the top portion of a bag 4 as illustrated in FIG. 4. Each bag 4 is ordinarily somewhat larger in diameter than the can lids 120 enclosed therein. Therefore, there is some slack in each bag. As the jaws 114 and 114' of a pincer assembly close on the bag, they will squeeze (pinch) the slack portions of the bag between them and create a fold or wrinkle at the top of the bag.

Five substantially identical detectors 48 are provided, of which only one is visible in FIGS. 1 and 3. Each detector is positioned on the underside of gripper frame or plate 46 between the two pincer assemblies 47 of one row of pincer assemblies. As shown in FIG. 3, each detector 48 includes a suspending member 71 fixed to the underside of gripper frame or plate 46. Suspending member 72 has a vertically extensive tubular member 72, a vertically extensive slot 78 extending through the wall of such tubular member. The detector also includes a feeler consisting of a vertically disposed pin 73 received in the bore of tubular member 72 and a horizontally disposed disk or plate 74 fixed to the lower end of pin 73. A cross pin 79 is fixed to pin 73 and extends into slot 78. Thus, the feeler is freely moveable relative to gripper frame 46 between the upper position illustrated in broken lines and the lower position illustrated in solid lines. When the feeler is in its upper position, pin 73 extends beyond the upper end of tubular member 72, as indicated in broken lines at 73'. A small electrical switch 75 is provided in the detector, the body of switch 75 being connected to plate 46 by a bracket 77. Switch 75 has a lever-like actuating member 76. When switch 75 is in its normal, open condition, actuating member 76 extends over the top of tubular member 72, as shown in solid lines in FIG. 3. However, when the feeler is in its upper position and extends above tubular member 72 as indicated in broken lines at 73', actuating member 76 is displaced to the position shown in broken lines at 76'. When actuating member 76 is in this displaced position, switch 75 is in a closed condition. Switch 75 thus detects the position of the feeler. When the feeler is in its lower position the switch is open, but when the feeler is in its upper position the switch is closed.

As illustrated in FIG. 1, a partition removing device E is provided, such device including a rotary actuator 62 supported from guide rail 23 by a bracket 61. An arm 64 is fixed to the shaft 63 of rotary actuator 62 so that the actuator can swing the arm about the axis of shaft 63. Arm 64 extends generally downwardly from shaft 63. A fluid operable cylinder 65 is mounted to the lower end of arm 64 by a block 66. When arm 64 is in the position illustrated in FIG. 1, cylinder 65 is disposed generally vertically and the piston rod 68 of such cylinder extends downwardly. A suction cup 67 is fixed to the end of piston rod 68.

Appropriate pressurized fluid supply means, such as a source of compressed air (not shown) and control means (not shown) are provided for actuating the various cylinders described above according to the sequence of operation described below. Also, an appropriate suction source is connected to suction cup 67, the suction source also being controlled by the control means of the apparatus for operation in sequence as described below.

To operate the apparatus, a series of boxes including boxes 3a, 3b and 3c are placed on the upstream or righthand section of the conveyor A (FIG. 1). The tops of the boxes are opened before the boxes are placed on the conveyor. Each box contains two vertically superposed layers of bags 4, five such bags being included in each layer. The bags of each layer extend generally horizontally and are disposed in parallel, side by side relation with one another. Adjacent bags within each layer are in close lateral proximity to one another and may, in fact, be in contact with one another.

The boxes are advanced downstream in the direction indicated by the arrow 2 by rotation of rollers 2. When the leading box 3a of the sequence has advanced beyond stopping device F, it trips an appropriate detector such as a photoelectric cell or switch (not shown). In response to actuation of such detector, the control means of the apparatus actuates cylinder 5 of stopping device F to raise stop rod 97 (FIG. 2) above rollers 2 and thus arrest the downstream travel of the next box 3b (FIG. 1) in the sequence and of the following boxes in the sequence. Because the leading box 3a is downstream of the stopping device when the stop rod is raised, the downstream travel of such leading box is unimpeded by actuation of the stopping device. The leading box 3a moves downstream until it arrives at the pickup location shown in FIG. 1 adjacent the downstream end of conveyor A. When leading box 3a arrives at the pickup location, it actuates appropriate detectors (not shown) which in turn actuate appropriate arresting devices (not shown) to retain such box at the pickup location. When box 3a arrives at the pickup location, arm 64 of partition remover E is not in the position illustrated in FIG. 1. Rather, the arm is in a retracted position in which it extends to the rear of the apparatus so that the lower end of arm 64, cylinder 65 and suction cup 67 are remote from conveyor A and box 3a. Cylinder 27 is actuated to move carriage 40 to the right until the carriage is above box 3a and cylinder 41 is then actuated to lower the gripping mechanism G downwardly onto the bags of the top layer in box 3a. As the gripping mechanism descends onto the bags, the jaws 114 and 114' of each of the pincer assemblies 47 are all in the open condition illustrated in FIG. 4. Thus, the two sides of a bag, such as the bag 4 illustrated in broken lines in FIG. 4 and the jaws will pinch the topmost portions of such bag. Because the pincer assemblies are arranged in rows, such rows being side by side, parallel to one another and parallel to the direction of elongation of the bags, each bag will be pinched by the two pincer assemblies of a single row. For example, bag 4a is pinched by the pincer assemblies 47a and 47b (FIG. 3). Once the jaws of the pincer assemblies have been brought into contact with the bags in this fashion, compressed air is introduced into the cylinder 101 of each pincer assembly (FIG. 4) to force the jaws 114 and 114' of each pincer assembly towards one another so that they firmly grip the bag pinched therebetween. Of course, the ten pincer assemblies 47 (FIG. 1) pinch all five bags of the top layer in the box simultaneously.

Once the bags have been firmly pinched with the pincer assemblies and hence with the gripper mechanism in this fashion, cylinders 27 and 41 are actuated to move gripper mechanism G and the bags pinched therewith to the discharge location atop base B. First, cylinder 41 is actuated to lift the gripper mechanism and bags upwardly out of box 3a. After the gripper mechanism and bags have been elevated in this fashion, cylinder 27 is operated to slide the carriage and hence the gripper mechanism and bags horizontally until they reach the position illustrated in FIG. 1. Cylinder 41 is then operated to lower the gripper mechanism G and the bags 4 pinched therewith until they are adjacent the top surface 12 of base B. When the gripper mechanism is in this discharge location, closely adjacent the top surface of base B, the air pressure within the cylinders of the pincer assemblies is released so that the jaws of the pincer assemblies move away from one another to release the bags 4 and deposit them on the top surface 12 of base B. The bags so deposited may be moved away from the discharge location by appropriate devices (not shown). For example, the top surface 12 of base B may be formed from a run of an endless belt, and such belt can be moved to transfer the bags away from the discharge location to further processing operations.

While the carriage 40 and gripper mechanism are adjacent the discharge location and hence remote from the pickup location and remote from box 3a, rotary actuator 62 swings arm 64 to the disposition illustrated in FIG. 1, thus positioning cylinder 65 and suction cup 67 above box 3a. Cylinder 65 is actuated to lower suction cup 67 downwardly into the box until the suction cup contacts the flat, plate-like cardboard divider (not shown) positioned immediately above the second or lower layer of bags 4. Suction is applied through suction cup 67 so that the suction cup and the divider engaged therewith until the divider is above the top of box 3a. Rotary actuator 62 then swings arm 64, cylinder 65, suction cup 67 and the divider back away from conveyor A and hence away from box 3a. Once the divider is clear of the conveyor and the box, the suction is released and the divider falls away from the suction cup.

Cylinders 27 and 41 are operated to move the gripper mechanism G back to the pickup location by first elevating the gripper mechanism away from base B, then sliding the carriage 40 and then operating cylinder 41 to lower the gripper mechanism into box 3a. During this operation, the lower end of arm 64 and the cylinder 65 are held away from box 3a and out of the path of the gripper mechanism. When the gripper mechanism is lowered into the box to engage it with the bags 4 of the second layer (the bags illustrated within box 3a in FIG. 1), the gripper mechanism is brought to a lower elevation than the elevation previously utilized during engagement of the gripper mechanism with the bags of the first or topmost layer, because the bags of the second layer are disposed within the box at a lower elevation than the bags of the first or topmost layer. The pincer assemblies pinch the bags of the second layer and the gripper mechanism is moved back to the discharge location in the same manner as described above to transfer the bags of the second layer to the discharge location atop base B.

Once the second layer of bags has been removed from box 3a, the box is empty. Cylinder 7 is actuated to swing a pair of ejector rails (not shown) upwardly through spaces 8 and 9 between rollers 2 of conveyor A until the ejector rails lift box 3a off of rollers 2. When the ejector rails are elevated in this fashion, the ends of the rails adjacent side plate 1 of conveyor A are higher than the ends of the ejector rails adjacent side plate 1' so that the empty box slides down the ejector rails under the influence of gravity and falls off of conveyor A. The ejector rails are then lowered, cylinder 5 of box stopping device F is actuated to release the next box 3b for advancement at the pickup location, and the operations described above are repeated.

In normal operation of the apparatus as described above, the gripper mechanism G properly pinches all five bags in a layer on each cycle. Although the gripper mechanism is generally reliable, it may occasionally fail to pinch a bag or else pinch a bag improperly. Such lack of engagement or improper engagement can be caused by misalignment of the bags with the jaws of the pincer mechanisms. The bags may deviate slightly from their intended positions within the boxes and the boxes may also deviate slightly from their intended positions on conveyor A. Either condition can produce misalignment between the bags and the jaws of the pincer assemblies and impede proper pinched engagement of the bags by the gripper mechanism.

If a bag is not pinched at all by the gripper mechanism, the bag will remain in the box. If one of the bags in the top layer within a box remains in the box when the other bags of the top layer have been removed from the box, the gripper mechanism will encounter such remaining bag when it is lowered into the box to pinch the bags of the second layer on the next cycle. Such unintended contact of the gripper mechanism with the remaining bag can rupture the bag, damage the can lids enclosed within the bag, or possibly even damage the gripper mechanism. If a bag is pinched by only one pincer assembly instead of the normal two, the end of the bag opposite the pinched portion can hang downwardly from the gripper mechanism as the gripper mechanism travels towards the discharge location. For example, the bag 4b illustrated in broken lines in FIG. 3 has been pinched only by pincer assembly 47b and has not been pinched by pincer assembly 47a. A bag which is improperly pinched in this fashion may initially move with the gripper assembly towards the discharge location, but the downwardly depending portions of such a bag may hit the wall of the box. If such a collision occurs, the bay may rupture, scattering can lids about the apparatus. Even absent such a collision, an improperly pinched bag may fall from the gripper mechanism during transfer.

Detectors 48 (FIGS. 1 and 3) prevent such accidental occurences. As set forth above, one such detector is provided for each row of two pincer assemblies and each detector is mounted between the two associated pincer assemblies. When a bag is properly pinched by both pincer assemblies in the row, as is the bag 4a illustrated in broken lines in FIG. 3, the disk 74 of the feeler rests on the top of the bag and the feeler is retained in its upper position as illustrated in broken lines in FIG. 3. Conversely, when a bag is pinched by one or both of the pincer assemblies in the row, the bag does not have imparted to it such sensing means retaining capability and the feeler is not retainable in its upper position (see 4b in FIG. 3). The pin 73 of the feeler extends upwardly from the tubular member 72 as indicated in broken lines at 73' so that the pin holds actuating member 76 of switch 75 in the position illustrated in broken lines at 76' and keep the switch in its closed condition. Of course, if all five rows of pincer assemblies properly pinch the respective bags, the switches of all of the detectors will remain closed. The switches are electrically connected in a circuit (not shown) which is arranged so that the switches of all of the detectors must be closed to produce a positive signal or indication. If one of such switches is open or if more than one is open, the circuit will not produce the positive signal but instead will produce a contrary negative signal or indication. Such circuit is connected to the control mechanism of the apparatus (not shown) so that the control mechanism will not actuate cylinders 27 and 41 to move the gripper mechanism G towards the discharge location (i.e., away from the box) if the aforementioned positive signal is absent.

Thus, if one pair of pincer assemblies is improperly pinched with a bag, as illustrated in broken lines at 4b in FIG. 3, the feeler of the associated detector will not be supported in its upper position. Such feeler will drop to its lower position as illustrated in solid lines in FIG. 3 so that the associated switch 75 will open and the circuit will not produce the positive indication or signal. Likewise, if a pair of pincer assemblies completely fails to pinch a bag, the feeler of the associated detector will drop to its lower position causing the associated switch to open. If the positive signal is absent, the apparatus will stop. Therefore, if any one of the pairs of pincer assemblies fails to pinch a bag or pinches a bag improperly, the apparatus will stop before the stray bag can cause any damage. The workers tending the apparatus can retrieve the bag manually and then restart the apparatus.

Of course, as no bags are pinched with the pincer assemblies during return travel of the gripper mechanism G from the discharge location to the pickup location, the positive signal will not be produced during such travel. The control mechanism of the apparatus is arranged to ignore the absence of the positive signal during such return travel. Movement of the gripper mechanism will only be arrested if the positive signal is absent during travel of the gripper mechanism from the pickup location towards the discharge location.

Numerous variations and combinations of the features described above can be utilized. Merely by way of example, the bags to be transferred could be presented at the pickup location on pallets rather than in boxes as described above. Accordingly, the foregoing description of a preferred embodiment should be taken by way of illustration rather than by way of limitation of the present invention.

What is claimed is:

1. Apparatus for simultaneously pinching a plurality of horizontally elongated bags disposed side by side, parallel to one another and in close lateral proximity to one another at a pickup location and transferring such bags to a discharge location, said apparatus comprising:
   (a) gripper means for pinching each bag at two longitudinally spaced locations adjacent the topmost portion of such bag thereby to impart sensing means retaining capability to such bag;
   (b) means for moving said gripper means from said pickup location to said discharge location while said bags are pinched thereby; and
   (c) sensing means for detecting the state of such pinched engagement of said bags with said gripper means, producing a positive signal only if every one of said bags is pinched by said gripper means at both of the aforesaid two locations thereon such that said bags all have imparted thereto,
   said sensing means retaining capability and stopping operation of said moving means if said positive signal is absent.

2. Apparatus as claimed in 1 in which said gripper means includes a gripper frame and a plurality of pairs of pincer assemblies mounted to said gripper frame, the bag-pinching portion of said pincer assemblies being disposed substantially in a common horizontal plane beneath said gripper frame, the pincer assemblies of each pair being disposed in a row, such rows being side by side and parallel to one another, the pincer assemblies of each of said pairs being disposed to pinch one of said bags, said moving means being operative to move said gripper frame.

3. Apparatus as claimed in claim 2 in which said sensing means includes a plurality of feelers and a plurality of switch means for providing said positive signals, each such feeler being mounted to said gripper frame for movement relative thereto between an upper position and a lower position, one of said feelers being mounted between the pincer assemblies of each of said pairs, each such feeler being retained in its upper position by a bag pinched by the associated pair of pincer assemblies, said switch means being positioned beside said feelers and being operative to detect the upward movement of said feelers and produce said positive signal only when all of said feelers are in their respective upper positions.

* * * * *